May 22, 1951  S. C. MOON  2,554,047
HYDRAULIC ENGINE COOLING AND LUBRICATING
SYSTEM AND APPARATUS
Original Filed Sept. 14, 1944  2 Sheets-Sheet 2
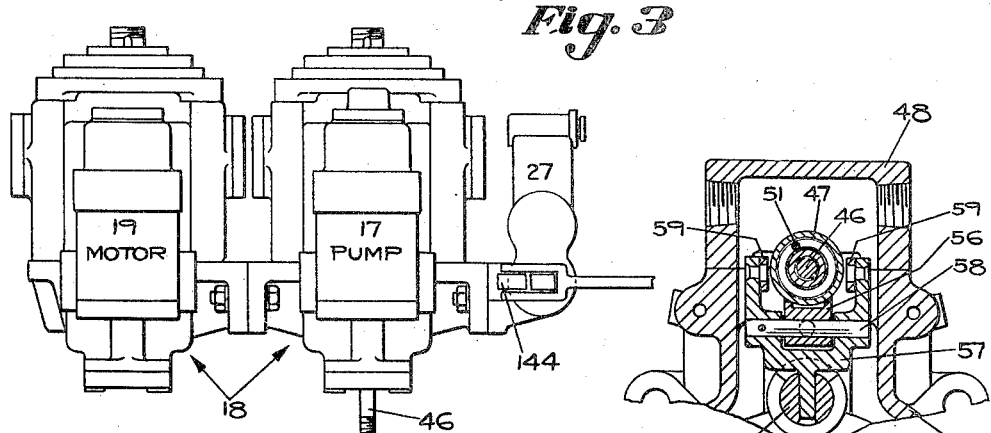
Fig. 3
Fig. 5
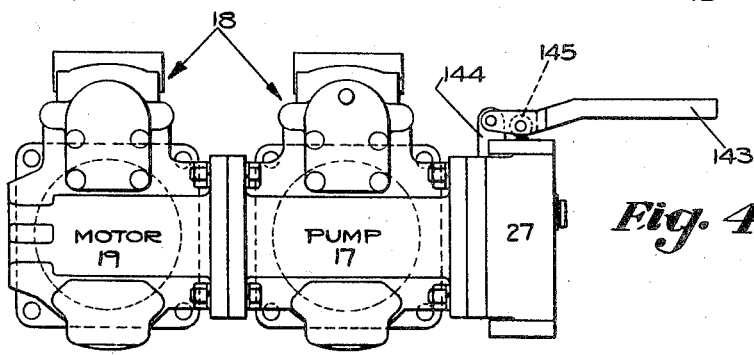
Fig. 4
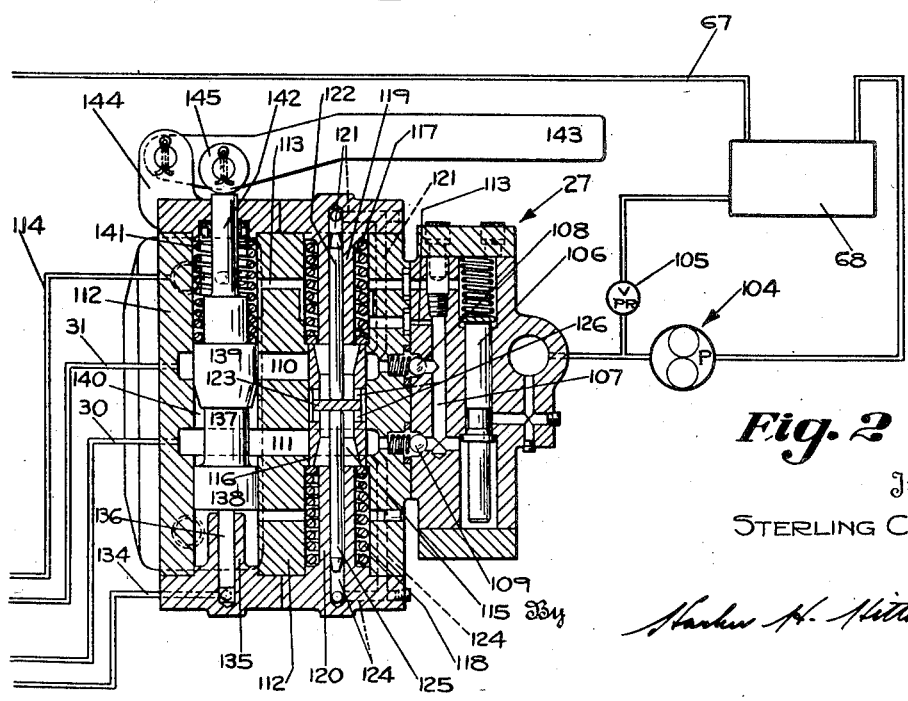
Fig. 2
Inventor;
STERLING C. MOON,
By
Attorney.

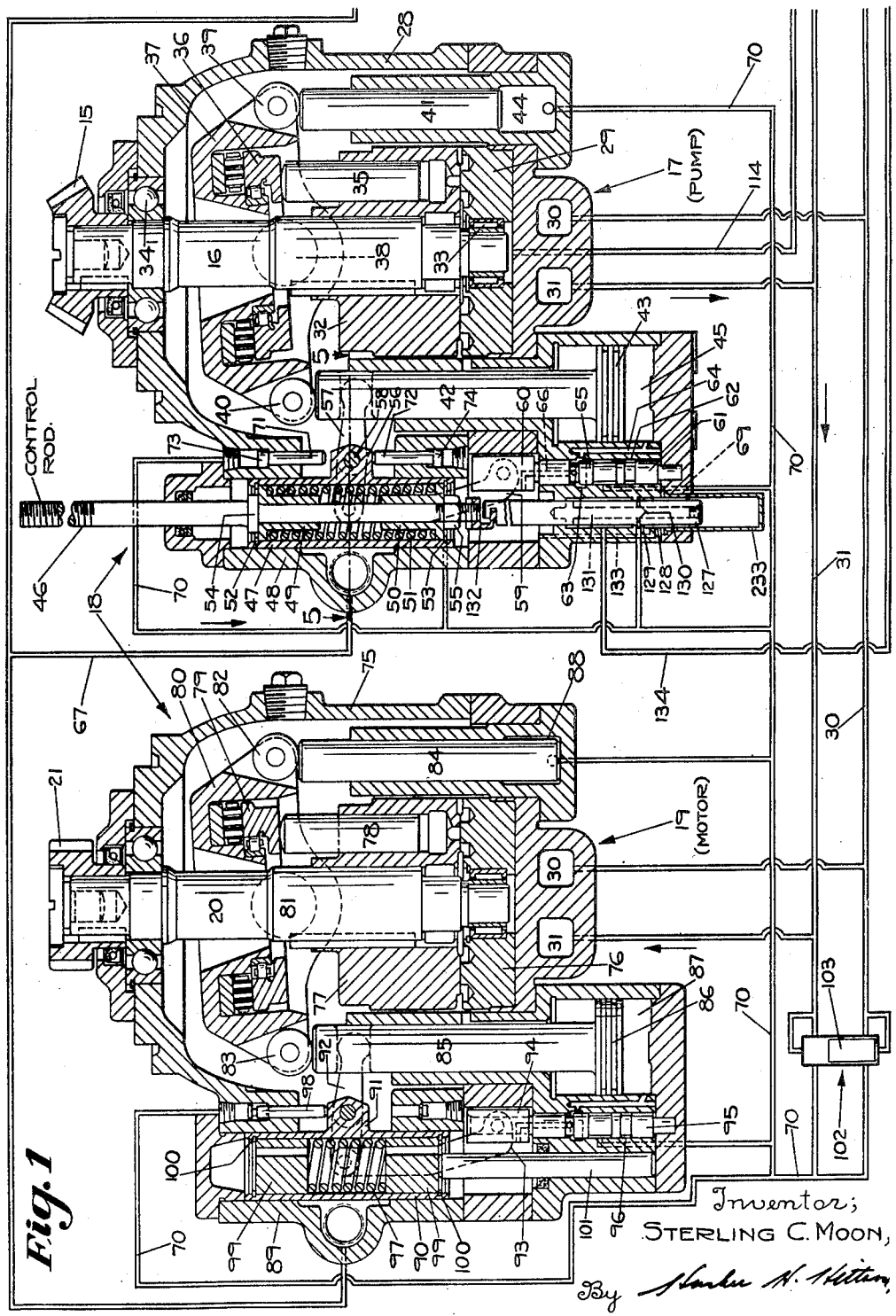

Patented May 22, 1951

2,554,047

UNITED STATES PATENT OFFICE 2,554,047

HYDRAULIC ENGINE COOLING AND LUBRICATING SYSTEM AND APPARATUS

Sterling C. Moon, Worthington, Ohio, assignor to The Jeffrey Manufacturing Company, a corporation of Ohio Original application September 14, 1944, Serial No. 554,125. Divided and this application June 4, 1947, Serial No. 752,355

3 Claims. (Cl. 103—202)

My invention relates to a hydraulic engine cooling and lubricating system and apparatus which is of particular use in a hydraulic transmission adapted for use in a truck, but which may have other uses.

It is an object of my invention to provide an improved adjustable hydraulic transmission apparatus wherein a hydraulic pump of variable capacity drives a hydraulic motor through a substantially closed hydraulic circuit and wherein there is provided a second hydraulic pump which supplies cooling and lubricating fluid to the housing means of the variable capacity pump and motor for cooling and lubricating working parts therein irrespective of the operation or the adjustment of the transmission apparatus.

In carrying out the foregoing object it is another object of my invention to utilize the pump which supplies cooling and lubricating fluid to the transmission for also supplying hydraulic fluid to the closed hydraulic circuit for replacing hydraulic fluid lost or displaced therefrom.

It is another object of my invention to provide in a hydraulic engine of low volumetric hydraulic fluid displacement which operates at or produces a high torque, an improved cooling and lubricating system and apparatus wherein hydraulic fluid is supplied independently of hydraulic fluid in the engine to working parts thereof for cooling and lubricating them.

More specifically it is an object of my invention to provide in a hydraulic apparatus wherein there is included a hydraulic engine having a rotor mounted on bearings and cylinders with reciprocating pistons therein wherein the cylinders co-operate with a port or valve plate, an improved lubricating and/or cooling system whereby hydraulic fluid is supplied to the port or valve plate and/or the bearings independently of the volume of hydraulic fluid passing through the port or valve plate.

Even more specifically it is an object of my invention to provide in connection with an adjustable capacity hydraulic pump capable of adjustment upwardly from a zero output volume of hydraulic fluid wherein the pump includes a bearing mounted rotor having cylinders and reciprocating pistons therein wherein the cylinders co-operate with a port or valve plate, an improved lubricating and/or cooling system whereby hydraulic fluid is supplied to the port or valve plate and/or the bearings independently of the volume of hydraulic fluid passing through the port or valve plate.

Other objects of the invention will appear hereinafter the novel features and combinations being set forth in the appended claims.

In the accompanying drawings,

Figs. 1 and 2 together show in detail a hydraulic transmission embodying my invention and the hydraulic piping diagram therefor;

Fig. 3 is a plan view of the hydraulic transmission shown in Figs. 1 and 2;

Fig. 4 is an elevational view thereof; and

Fig. 5 is a detail sectional view taken on the line 5—5 of Fig. 1, looking in the direction of the arrows.

This application is a division of my co-pending application, Serial No. 554,125, filed September 14, 1944, now abandoned, for a Truck and Hydraulic Transmission. It is to be understood that the construction and operation of the system and apparatus of this application follows that of my parent application, above identified.

The hydraulic transmission illustrated in the drawings forms an improved part of a truck which is disclosed in my parent application, above identified, which truck is disclosed and claimed in United States Patent No. 2,395,333, issued February 19, 1946, to Arthur L. Lee, for a Mine Truck.

In the application and patent above identified the hydraulic transmission forms a part of a truck which includes a main frame that is supported upon four wheels, all of which may be driven and steered. Mounted upon the main frame of the truck there is an electric motor that is connected through shafts and bevel gears one of which gears meshes with and drives a bevel pinion 15 which is keyed to a shaft 16 (see Fig. 1) of a pump 17 of the hydraulic transmission which as a unit is designated 18.

The hydraulic fluid output of the pump 17 is delivered to a motor 19 of the hydraulic transmission, the rotary shaft 20 (see Fig. 1) of which drives a pinion 21 which is connected through suitable geared shafting, universal joints, and differentials to drive the wheels of the truck, all as disclosed in Patent 2,395,333, above identified.

The truck disclosed may be used for a variety of purposes, but the hydraulic transmission may be used with a variety of trucks and has certain characteristics which make it particularly desirable for such devices as loading machines, mining machines, mine locomotives, and shuttle cars employed in underground coal mines. For example, in a loading operation the loader is fed slowly into a pile of coal and there is an appreciable resisting force against which the loader must be pushed to effect the gathering of coal. It is desirable that the feed rate of the loading machine be such as not to overload the unit and yet be such as to maintain a high efficiency of operation at all times.

The hydraulic transmission which I have provided operates automatically to feed the truck at a maximum speed consistent with a non-overloading condition, but whenever high resisting forces, or, in other words, heavy loads, are encountered the hydraulic transmission operates automatically to reduce the feed rate, while at the same time increasing the torque or pushing force so that the machine will not overload or stall but will continue to feed itself into the material at whatever rate the resisting force dictates; the transmission being such as to produce a maximum torque at minimum or zero speed. This is an extremely desirable characteristic in loaders, mining machines, mine locomotives and shuttle cars, and it is a characteristic which may find useful application in other machines, vehicles or the like. Because of this fact it is to be understood that the hydraulic transmission, in certain broader aspects of my invention, may have a general use, though in its more specific application it is particularly useful in mining machines of the above-mentioned type.

Referring first to Figs. 3 and 4 of the drawings, it will be noted that the hydraulic transmission 18 including the pump 17 and the motor 19 are physically bolted together by bolting their housings as a unit, and also bolted to the housing of the pump 17 is a valve unit 27, the structure of which is illustrated in detail in Fig. 2 of the drawings.

Referring to the detailed structure of the pump 17 as illustrated in Fig. 1 of the drawings, said pump is generally of standard construction and is of the longitudinal or axial piston type employing a wobble plate, it being modified, however, in certain particulars to perform the functions desired as above outlined. Said pump includes a housing or casing 28 within which is a port plate 29 of conventional structure, which may follow, for example, that disclosed in the patent to Robert K. Jeffrey, No. 2,331,694, dated October 12, 1943.

The port plate 29 has feed and exhaust ports, not illustrated, which communicate with feed passageways 30 and 31 formed in the head plate of the casing or housing 28. Since the pump 17 is reversible by adjusting the wobble plate to either side of its neutral position as hereinafter described, the passageways 30 and 31 may selectively be pressure and return passageways. As illustrated in Fig. 1 of the drawings, passageway 31 is the pressure passageway.

Within the housing 28 is mounted a rotor 32 carried on the previously mentioned shaft 16, which shaft 16 is mounted adjacent opposite ends in anti-friction bearings 33 and 34. The rotor 32 carries a plurality of axially reciprocating pistons 35, the outer ends of which are beveled and bear against an anti-friction mounted thrust plate 36 mounted on a pivoted wobble plate 37 pivotally mounted to the casing 28 about a central pivot or trunnions 38.

On opposite sides of the axis or pivot or trunnions 38 the wobble plate 37 carries anti-friction rollers 39 and 40, the former of which bears against the outer end of a piston 41, and the latter of which bears against the outer end of a piston rod 42 having a piston 43 mounted on its lower end, as viewed in Fig. 1 of the drawings.

Piston 41 is carried in a cylinder 44 mounted in the housing 28 which, as hereinafter described more completely, is subject to the pressure of the hydraulic fluid delivered at the output of the pump 17. This provides a continuing force on the wobble plate 37, tending to rotate it in a counter-clockwise direction as viewed in Fig. 1 of the drawings. In opposition to this force the piston 43, which is mounted in cylinder 45 formed as a part of the housing 28, exerts a larger force whenever hydraulic fluid is applied to it, since it has a greater area.

As a consequence, the angular position of the wobble plate 37 can be adjusted so that the effective plane thereof, which is the plane of the surface of thrust plate 36, can be varied through a plurality of positions. For example, if the plane of thrust plate 36 is perpendicular to the axis of the shaft 16, the pistons 35 will not reciprocate at all as the rotor 32 and shaft 16 are rotated, and consequently when the plane of thrust plate 36 is perpendicular to the axis of shaft 16 the pump 17 will idle, that is, it will not pump hydraulic fluid.

With the parts as illustrated in Fig. 2 of the drawings, it is evident that the plane of the wobble plate 37 and the thrust plate 36 are rotated slightly counter-clockwise to a plane perpendicular to the axis of shaft 16 and consequently as the rotor 32 and shaft 16 rotate, the pistons 35 will reciprocate and hydraulic fluid under pressure will be delivered to the passageway 31, passageway 30 under these conditions being the return or suction passageway. Obviously the volumetric output of the pump 17 may be varied upwardly from a zero output volume by adjusting the angle of the wobble plate 37 and thrust plate 36 with respect to the axis of shaft 16.

The pump output will be at maximum when this angle is the greatest and at minimum or zero when the plane thereof is at right angles to the axis of shaft 16. Furthermore, the direction of flow of the hydraulic fluid from the pump 17 will be reversed, while the shaft 16 rotates always in the same direction, depending upon whether the plane of the wobble plate 37 and thrust plate 36 is rotated in a clockwise or counter-clockwise direction from said right angle position, the volumetric output per revolution being dependent upon this angle. The pistons or rods 41 and 42 will lock the wobble plate 37 in position, the position being determined by the position of the piston 43 as hereinafter described more completely.

To control the direction of the hydraulic fluid output from the pump 17 as well as the volume thereof per revolution, I provide control mechanism which does not act directly to adjust the wobble plate 37, but which acts through a manual adjustment so as to set up a selected fluid pressure to be reached by the hydraulic fluid delivered by pump 17, and the pump operates automatically to adjust its volumetric output so as to produce and substantially maintain this selected pressure.

To this end I provide a control rod 46 which may be operated by any desired operating mechanism, which rod extends into a shiftable cage or shell 47 mounted for reciprocation in a housing extension 48 preferably formed as an integral part of the pump housing 28. The rod 46 slides through spaced sleeves 49 and 50 which receive a coil spring 51, tending to force the sleeves 49 and 50 apart, said sleeves 49 and 50 being held in the cage 47 by snap ring abutments 52 and 53. The sleeve 49 abuts an enlargement 54 on the rod 46, and the sleeve 50 abuts a nut 55 thereon.

It is obvious that if the rod 46 is moved in either direction from that illustrated, it will compress the spring 51, the force of which will be transmitted to the cage 47, tending to move it in the direction in which rod 46 is moved. Rod 46 can be moved to either side of its neutral position and the ultimate result will be to shift the wobble plate 37 from a maximum position in one direction through the neutral position to a maximum position in the opposite direction, thereby producing selectively any desired pressure on the output passageway of pump 17.

As best seen by reference to Figs. 1 and 5 of the drawings, cage 47 is provided with a boss 56 on which a yoke 57 is pivoted by a pin 58. The lower end of the yoke 57 extends into a recess in the piston rod 42 where it provides a pivotal connection therewith (see Fig. 5). The bifurcated upper ends of the yoke 57 are connected to shift rods 59, which are pivoted at opposite sides of an operating block 60 (Fig. 1) of a control piston 61 mounted in a cylinder or bore 62 formed in the casting which provides cylinder 45.

The cylinder 62 is provided with a peripheral chamber 63 which communicates by way of passageway or bore 64 with the lower end of cylinder 45, as viewed in Fig. 1 of the drawings. The piston or spool 61 is provided with a land 65 having an axial dimension adequate to cover the peripheral chamber 63. Above land 65 the spool or piston 61 is of reduced diameter and leads to a bore 66 therein which extends through the block 60 and communicates with the interior of the housing 48 which, as clearly illustrated in Fig. 5 of the drawings, is in direct communication with the interior of housing 28, all of which is connected by a drain pipe or conduit 67 which returns to a hydraulic tank 68 (see Fig. 2 of the drawings).

Extending to the bottom of the peripheral chamber 63 of cylinder 62 and leading to said cylinder 62 is a bore 69 formed in the casting which provides the cylinder 62 and cylinder 45, which bore 69 is connected to a pressure control pipe or conduit 70, which pipe or conduit 70 carries hydraulic fluid under pressure at all times, which pressure is the same as the pressure delivered by the pump 17 regardless of its direction of delivery, as hereinafter described more completely. In other words, the hydraulic pressure in conduit 70 represents the pressure in the system. This conduit is always a pressure conduit. As hereinafter described, hydraulic fluid under pressure is derived from said conduit to control both the pump and the motor as well as certain other devices, including the braking action of the motor 19.

As illustrated in Fig. 1 of the drawings, the pump 17 has its wobble plate 37 in position to deliver hydraulic fluid under pressure to the passageway 31, with the passageway 30 acting as the return. The control parts including the rod 46 and parts operated by it, are illustrated as having been moved downwardly, thereby to increase the pressure delivered to the passageway 31.

This increased pressure is effected by increasing the hydraulic fluid delivery to the motor, which tends to increase its speed and the increased speed will tend to build up its pressure which is reflected back to the control apparatus for the pump. In other words, the amount of fluid delivered by the pump 17 to the motor 19 for any setting of the control rod 46, will automatically be at the volume or rate which builds up and maintains the preselected pressure. For example, should the vehicle encounter easy travel, its speed will automatically increase to build up the predetermined pressure determined by the setting of control rod 46. On the other hand, should the vehicle encounter a higher resisting force, the volume will automatically decrease to maintain the preselected pressure in the line 70.

This is effected by the following operations. With the rod 46 moved downwardly, as illustrated in Fig. 2 of the drawings, it will transmit a force to the spring 51 which in turn will transmit a force to the shell 47, and in the absence of some holding force the shell 47 will move downwardly as illustrated and thus move its pivot pin 58 downwardly. Since the yoke 57 is pivoted to the rod 42, which is stationary for the moment, the pivoting of the yoke 57 will move its lower end downwardly and through rods 59, shift the spool or piston 61 downwardly so that land 65 uncovers the peripheral chamber 63. Under these conditions, the cylinder 45 below the piston 43 will be drained to the interior of the housing or casing 28 through bore 64, uncovered chamber 63 and bore 66 which communicates with the interior of housings 48 and 28.

Pressure in the control circuit or conduit 70 is always applied to the piston 41, tending to rotate the wobble plate 37 in the counter-clockwise direction, and this release of hydraulic fluid ahead of piston 43 will permit such counter-clockwise rotation of the wobble plate 37. This movement will, of course, swing the yoke 57 about its pivot 58, which through the rods 59 will move the spool or piston 61 upwardly so that land 65 covers the chamber 63, sealing off the above-described passageway and again locking the piston 63 in position.

As previously mentioned, the pressure of the hydraulic fluid output of pump 17 and thus the pressure in the control conduit 70 is determined by the position of the rod 46. The rod 46 also controls the direction of the hydraulic flow from pump 17 so that either passageway 30 or 31 may be the pressure passageway. Thus both the direction and the volume of the hydraulic fluid pressure delivered by pump 17 may be controlled, and this pressure is automatically determined for each position of the control rod 46.

To effect this automatic operation, when rod 46 is moved to any position except that which would put the wobble plate 37 in neutral, the tendency, of course, is for the spring 51 to transmit directly any movement of the rod 46 to the shell 47. However, the spring 51 provides an impositive connection between rod 46 and shell 47. Shell 47 is subject to centering forces which measure directly the pressure of the hydraulic fluid in the system, namely, the pressure in conduit 70 which is the pressure delivered by the pump 17 and received by the motor 19. Consequently, the shifting of the wobble plate 37 will be adjusted automatically so that the pressure in the system is determined by the position of rod 46. For example, if rod 46 is adjusted as above mentioned to change the angle of the wobble plate 37, thereby to increase the volume of the hydraulic flow from pump 17 to motor 19, the tendency would be for the pressure to increase if the motor 17 encounters the same load due to its increase in speed.

This pressure in line 70 is delivered to two centering pistons 71 and 72 which are mounted in cylinders or bores formed in the casing 28, said pistons 71 and 72 being positioned on opposite sides of the boss 56 of shell 47. The pistons 71 and 72 have enlarged heads 73 and 74, respectively, so that at their maximum extended positions their heads strike abutments on their cylinders, and the dimensions of the parts are such that when both said heads strike said abutments, said cage 47 and boss 56 will be in their central positions.

The cylinders which receive the pistons 71 and 72 both derive hydraulic fluid under pressure from conduit 70 and consequently the centering force delivered to the shell 47 through the boss 56 by the pistons 71 or 72 will necessarily match the force developed by the spring 51 caused by movement of rod 46. Piston 71 will supply this centering force if rod 46 is moved upwardly from its normal or released position. Piston 72 will supply this centering force if the rod 46 is moved downwardly from said neutral position. Once the rod 46 is moved to a desired position and held there, the pressure in the system will be maintained at a predetermined value determined by the position of the rod 46, and to effect this the shell 47 is free to move against pistons 71 or 72 as the case may be, to shift the spool 61 which in turn shifts the wobble plate 37 to control the output of pump 17 so that its rate of fluid delivery is such that, considering the opposition to rotation set up by the motor 19, it insures said predetermined pressure.

It is thus to be particularly noted that the control rod for pump 17 does not control directly its volumetric output per revolution, but on the other hand controls through a wide range the pressure of the hydraulic fluid delivered by said pump, and the volume of the pump automatically accommodates itself to maintain this preselected pressure as determined by the resistance to movement which the motor 19 offers.

Attention is now directed particularly to the construction of the motor 19 which in many particulars follows closely that of the pump, but which includes certain important differences which shall be pointed out. It may be mentioned that unless a contrary fact is indicated, the structure of the motor 19 is the same as the pump 17.

The motor 19 includes a casing or housing 75 containing a port plate 76 which communicates with the passageways 30 and 31 which are common with the pump passageways 30 and 31 since in the actual construction these passageways are a continuation between the pump and the motor, being formed in the head castings of each of them which are bolted together to form a single housing or casing means for both the pump 17 and motor 19, as clearly illustrated in Figs. 3 and 4 of the drawings. It is for this reason that they are given the same reference characters on both the pump and the motor.

Within the housing 75 is a rotor 77 having a plurality of axially reciprocating pistons 78 which bear against a thrust plate 79 mounted in antifriction bearings in an adjustable wobble plate 80. The wobble plate 80 is mounted on spaced trunnions or pivots 81, on opposite sides of the axis of which are anti-friction rollers 82 and 83 bearing on the outer ends of piston 84 and piston rod 85, respectively, said piston rod 85 carrying a piston 86 movable in a cylinder 87 formed as a part of the housing 75.

The piston 84 extends into a cylinder 88 attached to and forming a part of the housing 75 and connected to the pressure conduit 70 so that piston 84 is always responsive to the pressure of the hydraulic system and tends to swing the wobble plate 80 in a counter-clockwise direction against the piston rod 85 which co-operates therewith to lock it in adjusted position.

It may be noted that the piston 84 is longer than the similar piston 41 of the pump. This is because the wobble plate 37 of the pump is adapted to swing to opposite sides of the zero output position of said pump which is the position in which its plane is set at right angles to the axis of shaft 16. The motor 19, however, preferably has a minimum displacement so the plane of the wobble plate 80 as well as the thrust plate 79 is never exactly perpendicular to the axis of shaft 20. Furthermore, the plane of said wobble plate 80 can only swing in a counter-clockwise direction from a near perpendicular relation to the axis of shaft 20. As a consequence, the motor 19 always rotates in the same direction, provided the fluid flow to it is in the same direction. It is reversed by reversing the direction of the fluid flow to it, which is effected by the pump 17 as above described.

The motor casing 75 is provided with an extension 89 which receives a cage or shell 90 similar in construction to the pump shell 47. Shell 90 has a boss 91 upon which is pivotally mounted a bifurcated yoke 92 one end of which extends into and has a pivotal connection with the rod 85, the opposite bifurcated ends of which are connected to rods 93 which are pivotally connected to a block 94 of a piston or spool 95 working in a cylinder or bore 96 formed in the housing portion which provides cylinder 87.

The cage 90, boss 91, yoke 92, rods 93, block 94, spool 95 and cylinder or bore 96 are duplicates of the shell 47, boss 56, yoke 57, rods 59 and spool 61 and they operate in substantially the same way to control the actuation of piston 86 as the corresponding pump parts control the actuation of piston 43. It is therefore believed unnecessary to describe in further detail the other associated parts, particularly of the spool 95, since it functions to adjust the piston 86 and thus adjust in response to pressure the volumetric displacement per revolution of the motor 19 or, in other words, its speed of rotation for any given rate of hydraulic fluid delivery to it.

The mode of control, however, of the shell 90 differs from that of the shell 47, which I shall now describe. For example, shell 47 is controlled through a spring 51 under the opposing influences of the control rod 46 and the centering pistons 71 and 72. Shell 90, however, is controlled by the opposing influences of a coil spring 97 and a single piston 98 which is contained in a bore or cylinder provided in the casing 75, which is subject to the pressure in the system since it is connected to conduit 70. The spring 97 functions so that it tends to swing the wobble plate 80 always in a clockwise direction, thus tending to decrease the volumetric capacity per revolution of each piston and cylinder of the rotor 77 or, in other words, to increase the speed of shaft 20 for any given quantity of hydraulic fluid delivered thereto.

The piston 98 tends to control the shell 90 so that it acts through the piston 86 and its controlling spool 95 to overcome this tendency of the spring 97 or, in other words, in response to pressure in the conduit 70 to increase the volumetric displacement of the motor 19 per revolution and thus to decrease the speed of shaft 20 for any given rate of hydraulic fluid delivered thereto.

The action of the spring 97 and the counteraction of the piston 98 controlling the spool 95 either to drain the cylinder 87 or to deliver hydraulic fluid to it, operate as follows. Spring 97 is held between plugs 99 mounted on opposite sides thereof in shell 96 and held between snap rings 100 on opposite ends of said shell 96. The bottom plug 99 abuts a pin 101 which in turn abuts the head of cylinder 87 which is a part of the casing or housing 75. Spring 97 therefore urges rotation of wobble plate 80 in a clockwise direction. Pressure in the control conduit 70 is delivered to the cylinder containing piston 98 and urges it downwardly, as viewed in Fig. 1, or in opposition to the action of spring 97, thus urging the wobble plate 80 in a counter-clockwise direction which tends to increase its volumetric capacity per revolution and thus decrease its speed for any given volume of hydraulic fluid.

The spool 95 is shown moved downwardly from its neutral or normal position and thus is shown as draining the piston 87, which means that the pressure in line 70 has acted through piston 98 to overcome the spring 97 to actuate piston 86 in a manner to swing the wobble plate in a counterclockwise direction. The spring 97 is preferably pre-loaded so that a pressure of approximately 200 pounds per square inch is required in line 70 before wobble plate 80 is moved from its minimum position.

It is, of course, obvious that in both the pump and the motor should the pressure in line 70 decrease below that at which the wobble plate of each is locked, the spring 97 of the motor and the spring 51 of the pump would move their associated shells 96 and 47, respectively, upwardly as viewed in Fig. 1, from the neutral position of the control spools 95 and 61, respectively, which would cause hydraulic fluid to flow from the control conduit 70 through bore 69 of the pump and a similar bore of the motor into the chamber 63 of the pump and a similar chamber of the motor, and thus by bore 64 of the pump and a similar bore of the motor to supply hydraulic fluid to the cylinder 45 of the pump and piston 87 of the motor, thus to swing the wobble plates 37 of the pump and 80 of the motor, respectively, in a clockwise direction. This is not to infer that these actions always take place together, but since the action is similar in both instances whenever the condition is realized in the pump or the motor, the comparison is believed to be in the interest of clearness.

As previously mentioned, the control conduit 70 is always supplied with hydraulic fluid under pressure, regardless of whether passageway 30 or 31 is the pressure passageway. To this end a selector valve 102 is provided, which includes a cylinder connected at opposite ends to the passageways 30 and 31 as illustrated, and provided with a floating piston 103, the opposite heads of which are subject to the pressure of the passageways 30 and 31. If passageway 31 is the pressure passageway as illustrated, piston 103 will be moved downwardly, as illustrated, and the hydraulic fluid under pressure will flow through passageway 31 to conduit 70. Piston 103 under these conditions will block passageway 30 from passageway 70. Should passageway 30 become the pressure passageway piston 103 will move upwardly, as viewed in Fig. 1, blocking the previous connection between passageway 31 and conduit 70 and interconnecting passageway 30 and said conduit 70.

In Fig. 2 of the drawings I have illustrated a supercharging pump 104 which derives hydraulic fluid from the tank 68 and delivers it to the passageway 30 or 31, depending upon which is the suction, return or low pressure passageway as hereinafter described. The output of the pump 104 is delivered to the combination reducing, relief and brake valve designated generally 27. I also preferably provide a high pressure relief or pressure reducing valve 105 between the output of pump 104 and the tank 68.

The combination valve unit 27 includes reducing valve mechanism 106 which receives the output of pump 104 and reduces it to a relatively low pressure, such as 50 pounds per square inch, delivering the reduced pressure to a passageway 107. Passageway 107 communicates by means of ball check valves 108 and 109 with passageways 110 and 111, respectively, which are formed in the housing, casing or main block 112 in valve 27 and are connected to the passageways 31 and 30, respectively.

If passageway 31 is the pressure passageway, it will maintain check valve 108 closed and permit the output of pump 104 from the reducing valve 106 to enter passageway 30 through check valve 109. If a reverse condition exists, said output of pump 104 would be delivered to passageway 31.

In addition, a certain amount of hydraulic fluid in passageway 107 from pump 104 is metered through a passageway 113 to a passageway 114 which leads to the port plate 29 and bearing 33 of the pump 17, discharging into the interior of the casing 28 which is connected to drain pipe or conduit 67 for returning the hydraulic fluid to the tank 68. The function of this oil is to provide a cooling and lubricating fluid, particularly for the port plate 29 of the pump 17 which is the element which tends to generate the most heat during operation of the pump. This cooling device for the pump 17 is an important feature of my invention and obviously may be employed in hydraulic pumps generally.

The cooling device is of particular importance in hydraulic pump units such as the one disclosed wherein with the pump rotated at full or rated speed the volume of hydraulic fluid pumped by the pump 17 may be adjusted upwardly from a low or zero output volume because when the pump is adjusted to operate at a low or a zero volume there is little or no hydraulic fluid flowing through it which fluid, when the output volume is large, may act to cool sufficiently the port plate and other parts of the pump.

The relief characteristic of the combination valve 27 is provided by virtue of a cylindrical bore 115 formed in the body or block 112, in the central portion of which is a composite piston 116 which is normally held in a central position, as illustrated in Fig. 2 of the drawings, by means of a pair of coil springs 117 and 118 which surround cylinders 119 and 120, respectively, formed on top and bottom heads and which are individual to the relief valve portion of said combination valve 27.

The cylinder 119 is provided with a central bore 121 which receives a piston 122 which abuts a transverse web 123 of the piston 116. Similarly, the cylinder 120 is provided with a bore 124 which receives a piston 125 which abuts the opposite side of the web 123. Bore 121 is extended, as indicated, to passageway 110, and bore 124 is likewise extended, as indicated, to passageway 111. As a consequence, the pressures in the passageways 30 and 111 act on piston 125, tending to move piston 116 upwardly, and the pressures in passageways 31 and 110 act on piston 122, tending to move the piston 116 downwardly. When piston 116 is in its neutral position as illustrated, passageways 110 and 111 are isolated. However, if said piston 116 moves either downwardly or upwardly in response to an excess pressure in passageways 31 and 110 or 30 and 111, respectively, said passageways 110, 111 will be interconnected through the hollow piston 116 and radial ports 126 located on opposite sides of the partition 123 in a manner which is obvious from Fig. 2 of the drawings.

It is evident that this movement of the piston 116 will be by virtue of the hydraulic pressure on piston 122 overcoming the compression of spring 118, or the hydraulic pressure on piston 125 overcoming the compression of spring 117. The springs 117 and 118 are preferably identical and can be overcome to provide the relief valve characteristic at any desired pressure, such as 1800 pounds per square inch.

To provide the braking action of the motor 19 whenever the vehicle is traveling under its own power so as to drive the motor 19 as a pump, I provide an apparatus which I shall now describe. This braking action, of course, will take place only when the control rod 46 is in its neutral or zero position, in which the wobble plate 37 of pump 17 is in its perpendicular position with respect to the axis of shaft 16. Under these conditions, the action of the pump 17 is the same as though passageways 30 and 31 were shut off by valves, since they are blocked at said pump. It is necessary to disconnect effectively the braking mechanism except when the control lever 46 is in its neutral position. Otherwise, the braking mechanism would act as a relief valve and discharge the hydraulic fluid in the tank whenever its set pressure was exceeded, and in practice its set pressure is about 400 pounds per square inch which is considerably below the maximum operating pressure of the system.

Associated with the control rod 46 of the pump 17 is a piston 127 which slides in a cylinder 128 formed in the casting which provides for cylinder 45 and which at its approximate center is provided with an integrally projecting ring 129 which has close contact with the piston 127. The ring 129 is provided at its center with a peripheral chamber and when the rod 46 and the piston 127 are in their normal or neutral positions, this peripheral chamber aligns with radial bores 130 in the piston 129, which communicate with a longitudinal bore 131 therein, which adjacent the top of cylinder 128, as viewed in Fig. 1, is also provided with radial bores. An attaching clip 132 is provided to connect removably the rod 46 and piston 127.

The cylinder 128 is formed in part in the casting which provides for cylinder 45, as above mentioned, and in addition is formed in part in a cylinder extension 233. That portion of cylinder 128 below the ring 129 is connected to drain by being connected to the interior of housing extension 48 by means of bore 133.

The peripheral chamber in the ring 129 is connected to the control conduit 70. A brake line or pipe 134 extends into the cylinder 128 between the ring 129 and the top or head of said cylinder.

When control rod 46 is in its neutral position, the piston 127 will be in the position illustrated in Fig. 1 of the drawings. Under these conditions the hydraulic fluid under pressure in the control conduit or circuit 70 will flow through the chamber in ring 129 through the radial bores 130 to the longitudinal bore of piston 127, then on to the radial bores near the top of the longitudinal bore 131 to the cylinder 128 and then by way of brake line or pipe 134 to a cylinder 135 (see Fig. 2) formed in the bottom head of that portion of the valve 27 which constitutes the brake valve. The cylinder 135 is provided with a piston 136 which abuts the bottom of a large control piston 137 having spaced lands 138, 139 which have a close fit with a cylinder or bore 140 formed in the block 112.

Between the land 139 and the top head of the brake valve mechanism is a coil spring 141 through which a guide 142 extends, said guide projecting through the top of said brake valve. As clearly illustrated in the drawings, the land 139 normally isolates the pressure and return passageways 110 and 111. However, if a predetermined pressure is delivered to the brake line 134 sufficient to overcome the downward force developed by spring 141, the piston or spool 137 will be forced upwardly and provide a by-pass connection between the passageways 110 and 111 or, in other words, between passageways 30 and 31.

Under the assumed conditions, the motor 19 was acting as a pump, it being driven by the vehicle rolling down hill or being pushed. Since the output of the motor 19 acting as a pump cannot be delivered to pump 17 because its wobble plate is in the perpendicular position, this fluid has to go somewhere and as soon as the pressure in control conduit 70 is built up to a predetermined pressure, such as 400 pounds per squire inch, the valve 137 is actuated to allow the output of motor 19 to be delivered to the input passageway thereof, thus circulating the hydraulic oil through the braking valve 137, 140. This provides an automatic predetermined amount of braking action.

In order to increase this braking action above the minimum which is automatically determined, I provide a brake lever 143 which is pivoted at one end to a bracket 144 and which carries an anti-friction roller 145 adapted to roll on top of the projecting guide 142. Obviously, by pushing downwardly on the brake lever or handle 143, the braking action may be increased since this force will be added to that of the spring 141 which must be overcome by the pressure in the brake line 134 before the motor 19 acting as a pump will be relieved.

The engine 19 has been designated as a motor because in the hydraulic transmission it normally acts as such. However, as above mentioned, it, under certain circumstances, will act as a pump. Thus it is generically designated as an engine, the same as the pump 17 might also be designated as an engine since it could operate as a motor, though in my system it is not so employed.

To review briefly the operation of the hydraulic transmission, power is delivered to shaft 16 of pump 17 and power is delivered from shaft 20 of motor 19. The manner in which shaft 16 is driven and in which shaft 20 drives the vehicle, need not be repeated.

If control rod 46 is released, it assumes a normal condition by virtue of the supercharged hydraulic fluid in the line 70, which is fifty pounds pressure and which is delivered by the pump 104 (Fig. 2) to reducing valve 106 as above described. This supercharged fluid acts through the two centering pistons 71 and 72 to center the cage 47. When cage 47 is centered, the wobble plate 37 will be in its perpendicular or neutral position under the influence of the piston 41 and piston rod 42 and actuating piston 43. In other words, the fluid output of pump 17 will be zero.

Assuming now that the operator wishes to start the vehicle, he will operate the control rod 46 and the direction of operation thereof will predetermine the direction of operation of the vehicle, since it can be operated either forwardly or reversely. The extent to which the operator moves the rod 46 will determine ultimately the pressure of the hydraulic system, since the speed of the vehicle will increase from zero until this predetermined pressure is developed in the line.

Assuming that the operator moves the control rod 46 the maximum amount in either direction, the action will be the same except that in one instance the wobble plate will automatically adjust itself to drive the vehicle in one direction and in the other case it will operate to drive the vehicle in the other direction; reverse conditions producing pressure in the passageways 30 and 31, respectively, the other passageway in each instance being the return passageway.

Assuming that the rod 46 therefore is moved to the maximum amount, the output of pump 17 will be progressively increased by adjusting the wobble plate 37 automatically until the pressure in the system reaches a predetermined value which is preferably at approximately 1200 pounds per square inch. In other words, if the rod 46 is moved a maximum amount, the wobble plate 37 will be automatically adjusted by its control mechanism including the piston 43 and the control therefor until it reaches a maximum output and this maximum output will continue to be delivered until a pressure of 1200 pounds, for example, is reached in the output circuit of pump 17 and the input circuit of motor 19 which is also reflected in the control conduit 70. If rod 46 is moved only part way, pump 17 will start reducing its output at a correspondingly lower pressure and reach zero at a lower pressure.

If the power absorbed by the pump 17 continues to build up the pressure above 1200 pounds, and the control rod 46 is maintained in a maximum position, the wobble plate 37 will be automatically controlled by its piston 43 to decrease progressively the fluid output of pump 17 until 1800 pounds pressure is developed in the system, at which value the wobble plate 37 will have been returned to its normal position and the output of the pump 17 will be substantially zero. In other words, until the output pressure is 1200 pounds per square inch the output of the pump 17 will be at a maximum for maximum operation of rod 46. After this pressure is reached in the system, the output of pump 17 will be progressively decreased until a pressure of 1800 pounds per square inch is reached, when the pump 17 will be centered and its output substantially zero. Obviously the range indicated is only illustrative and either limit may be raised or lowered, though the range is a practical one which has been demonstrated in operation to be quite successful.

Considering now the action of the motor 19, its normal condition is with the wobble plate 80 substantially as illustrated, which is substantially its minimum displacement per revolution or, in other words, its highest speed condition since it delivers the greatest speed for a given rate of fluid delivery under these conditions. This maximum speed or minimum consumption condition is maintained automatically until the pressure in the system reaches a predetermined value which is preferably approximately 500 pounds per square inch. If the pressure in the system builds up above 500 pounds per square inch, the wobble plate 80 is automatically adjusted by its control mechanism including the piston 86 and its control as previously described, to increase the consumption of the motor 19 for each revolution, or, in other words, to decrease the speed thereof for any given rate of oil delivery until the wobble plate 80 is in its maximum deflected position and the motor 19 is consuming the maximum amount of oil per revolution at a pressure of approximately 1200 pounds per square inch.

It is to be noted that this is the pressure at which the pump 17 starts to reduce its output. Therefore, if the vehicle is starting under a very heavy load or encounters a very heavy load condition, with the lever 46 adjusted to the maximum, the first thing that will happen will be for the motor 19 to increase its volume of oil consumed per revolution and thus decrease its speed until a pressure of 1200 pounds per square inch is developed in the system where its consumption per revolution will be at a maximum. Thereafter, as the force which the vehicle must overcome increases, the output of the pump 17 will progressively decrease while its pressure progressively increases. The decrease in fluid output will, of course, decrease the speed of travel of the vehicle, while the increase in pressure in the system will increase the torque of the motor 19. As a consequence the vehicle will be a good hill climber or have good starting characteristics under a heavy load, or be a good pusher because the transmission 18 will develop maximum torque at minimum speed. For this reason, the novel hydraulic transmission is particularly adapted for such devices as loading machines which require considerable pushing force to push them into coal; kerf cutters which may be either wheel mounted or cable controlled which require a large pushing or pulling force to feed the cutter into the coal; and shuttle cars which may when heavily loaded require very high starting torque at low speed.

The transmission is also well adapted for use in underground locomotives, particularly those which are used for gathering, and for starting under a very heavy load which requires a condition of high torque at low speed. It is obvious that other vehicles which require a high torque at low speed may advantageously employ the hydraulic transmission of my invention.

It may further be pointed out that in many of these machines in which this apparatus may be employed, it is extremely desirable that the high torque be developed without requiring a high speed, since it is a desirable characteristic of many machines to have them slow down when they encounter a strong resisting force and develop a very high torque at the low speed so as to overcome the resisting force gradually.

From the foregoing description it will be obvious that I have provided a hydraulic engine in the form of a transmission wherein there is an adjustable capacity hydraulic pump which is connected in a closed hydraulic circuit in which there is a hydraulic motor that is driven by the output fluid of the pump, that is, the output port of the pump is connected to the input port of the motor and the exhaust or outlet port of the motor is connected to the intake or suction port of the motor to thus form a substantially closed main or high pressure hydraulic circuit or system. It will also be obvious that the hydraulic transmission includes a second or low pressure hydraulic circuit wherein there is a tank, reservoir, or cooling means for cooling the hydraulic oil in the system; that there is a pump in the second or low pressure hydraulic circuit and an associated high pressure relief or pressure reducing valve for predetermining the maximum pressure in the low pressure hydraulic circuit and that the output port of the pump in the secondary or low pressure circuit is connected automatically to whichever of the pump feed passageways 30 or 31 is acting as the low pressure, suction or intake port of the adjustable capacity pump for supplying make-up hydraulic oil to the main or high pressure hydraulic circuit. The output port of the pump in the second or low pressure hydraulic circuit is also connected to continuously deliver hydraulic fluid to operating parts of the pump and into the housing of the engine from where the hydraulic oil is returned to the tank or reservoir and cooled for recirculation. The operation of the pump in the second or low pressure hydraulic circuit is independent of the operation of the adjustable capacity or variable volume pump in the main or high pressure circuit and therefore the working parts of the hydraulic engine will receive cooling and lubricating fluid at all times so long as the pump in the low pressure circuit is in operation.

The other features of the invention were believed to be fully described heretofore and will not be repeated.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. Hydraulic apparatus including a variable capacity hydraulic pump adapted to operate in a first hydraulic circuit, said pump having a port plate and means to adjust its output to a very low fraction of its maximum volume while operating at rated speed, a housing for said pump, a second hydraulic circuit including a tank, a hydraulic pump in said second hydraulic circuit having its intake port connected to receive hydraulic fluid from said tank, means connecting the output port of said second pump for conducting hydraulic fluid to said port plate and into said housing for cooling and lubricating working parts of said variable capacity pump including said port plate, and means connecting said housing to said tank for returning hydraulic fluid supplied thereto to said tank, whereby cooling and lubricating hydraulic fluid will be circulated to the aforesaid working parts of said variable capacity pump irrespective of the output capacity at which said variable capacity pump is operating.

2. Hydraulic apparatus including a variable capacity hydraulic pump adapted to operate in a first hydraulic circuit, said pump having a port plate and means operable to adjust its output to substantially zero while it is rotated at full speed, a housing for working parts of said pump including said port plate, a second hydraulic circuit including means for cooling the hydraulic fluid therein, a hydraulic pump in said second hydraulic circuit having its intake port connected to receive hydraulic fluid from said cooling means, means connecting the output port of said second pump for conducting hydraulic fluid to the port plate of said variable capacity pump and into said housing for cooling and lubricating working parts of said variable capacity pump including said port plate, means including a pressure reducing valve also connecting the output port of said second pump to said tank for controlling the output pressure of said second pump, and means connecting said housing to said tank for returning hydraulic fluid supplied thereto to said cooling means, whereby cooling and lubricating hydraulic fluid will be circulated to the working parts of said variable capacity pump as aforesaid irrespective of the output capacity at which said variable capacity pump is operating.

3. Hydraulic apparatus of the class described including a hydraulic engine adapted to operate in a first hydraulic circuit, said engine having a port plate and means operable to adjust the fluid flow through said engine to substantially zero while it is rotated at full speed, a housing for working parts of said hydraulic engine including said port plate, a second hydraulic circuit including means for cooling the hydraulic fluid therein, a pump having its intake port connected to receive hydraulic fluid from said cooling means, means connecting the output port of said pump to the port plate of said hydraulic engine and for supplying hydraulic fluid to said housing for cooling and lubricating working parts of said engine including said port plate, and means connecting said housing to said cooling means for returning hydraulic fluid to said cooling means, whereby the aforesaid working parts of said engine will be cooled and lubricated independently of its operation.

STERLING C. MOON.

REFERENCES CITED

The following references are of record in the file of this patent:

UNITED STATES PATENTS

| Number | Name | Date |
| --- | --- | --- |
| 1,312,701 | Magie et al. | Aug. 12, 1919 |
| 1,338,310 | Lawrance | Apr. 27, 1920 |
| 1,539,616 | Williams | May 26, 1925 |
| 1,755,169 | Anderson | Apr. 22, 1930 |
| 1,819,966 | Olson | Aug. 18, 1931 |
| 1,877,285 | Eckels | Sept. 13, 1932 |
| 1,899,949 | Fahrney | Mar. 7, 1933 |
| 2,331,694 | Jeffrey | Oct. 12, 1943 |
| 2,395,333 | Lee | Feb. 19, 1946 |

FOREIGN PATENTS

| Number | Country | Date |
| --- | --- | --- |
| 234,209 | Great Britain | May 28, 1925 |
| 382,537 | France | Feb. 10, 1908 |